US012624577B2

(12) United States Patent
Kesler

(10) Patent No.: US 12,624,577 B2
(45) Date of Patent: May 12, 2026

(54) LOCKABLE GUN MOUNT

(71) Applicant: Daniel Kesler, St. George, UT (US)

(72) Inventor: Daniel Kesler, St. George, UT (US)

( * ) Notice: Subject to any disclaimer, the term of this patent is extended or adjusted under 35 U.S.C. 154(b) by 0 days.

(21) Appl. No.: 18/164,007

(22) Filed: Feb. 3, 2023

(65) Prior Publication Data

US 2023/0250678 A1 Aug. 10, 2023

Related U.S. Application Data

(60) Provisional application No. 63/307,756, filed on Feb. 8, 2022.

(51) Int. Cl.

| | |
|---|---|
| ***E05B 73/00*** | (2006.01) |
| ***A47B 81/00*** | (2006.01) |
| ***F41A 17/02*** | (2006.01) |
| ***F41A 17/06*** | (2006.01) |
| ***F41A 17/30*** | (2006.01) |
| ***F41A 23/18*** | (2006.01) |

(52) U.S. Cl.

CPC ............ *E05B 73/00* (2013.01); *A47B 81/005* (2013.01); *F41A 17/02* (2013.01); *F41A 17/066* (2013.01); *F41A 17/30* (2013.01); *F41A 23/18* (2013.01)

(58) Field of Classification Search

CPC ........ F41A 17/02; F41A 17/066; F41A 17/30; F41A 23/18; E05B 73/00; A47B 81/005

See application file for complete search history.

(56) References Cited

U.S. PATENT DOCUMENTS

| | | | | |
|---|---|---|---|---|
| 554,252 | A * | 2/1896 | Falk | F41A 23/18 211/64 |
| 4,018,339 | A * | 4/1977 | Pritz | E05B 73/00 211/8 |
| 5,791,499 | A * | 8/1998 | Zebbedies | B60R 7/14 248/176.1 |
| 11,326,851 | B1 * | 5/2022 | Oldham | A47B 81/005 |
| 11,484,139 | B1 * | 11/2022 | Hagberg | F41A 23/18 |
| 11,819,126 | B2 * | 11/2023 | Schofield | F41A 17/44 |
| 2006/0060727 | A1 * | 3/2006 | Tucich | F41A 23/18 248/121 |
| 2011/0168649 | A1 * | 7/2011 | Stolz | A47B 81/005 211/64 |
| 2014/0157643 | A1 * | 6/2014 | Tucker | F41A 23/18 42/94 |
| 2014/0263107 | A1 * | 9/2014 | Arabian | B60R 7/14 211/8 |
| 2015/0128668 | A1 * | 5/2015 | Meredith | F41A 23/18 70/266 |

(Continued)

*Primary Examiner* — Joshua E Freeman

(74) *Attorney, Agent, or Firm* — Gurr & Brande, PLLC; Robert A. Gurr

(57) ABSTRACT

A lockable gun mount features a stock receiver, a trigger block, and a barrel lock. The stock receiver includes a base, sidewalls, a receiving aperture, and one or more fasteners. The trigger block includes a trigger rod and a wall member. The barrel lock includes a wall member, a hinged door coupled to the wall member, and a locking mechanism configured to secure the hinged door to the wall member. In some examples, the barrel lock further includes a biometric sensor. A cumulative force between the stock receiver, the trigger receiver, and the barrel lock prevents the gun from being removed from the lockable gun mount when secured to a wall or flat surface.

15 Claims, 18 Drawing Sheets

(56) References Cited

U.S. PATENT DOCUMENTS

| | | | | |
|---|---|---|---|---|
| 2016/0120308 | A1* | 5/2016 | Kubiniec | F41A 23/18<br>211/64 |
| 2017/0030114 | A1* | 2/2017 | Fisher | E05B 73/0041 |
| 2017/0122010 | A1* | 5/2017 | McCanna | A47B 81/00 |
| 2017/0276446 | A1* | 9/2017 | Irwin | F41A 17/06 |
| 2017/0361777 | A1* | 12/2017 | Bornais | B60R 7/14 |
| 2018/0289153 | A1* | 10/2018 | Sanchez | A47B 81/005 |
| 2019/0093969 | A1* | 3/2019 | Pintar | A47B 81/005 |
| 2021/0107410 | A1* | 4/2021 | Franklin | B60R 7/14 |
| 2023/0165367 | A1* | 6/2023 | Erbil | B60R 7/14<br>211/64 |

* cited by examiner

LOCKABLE GUN MOUNT

CROSS-REFERENCE TO RELATED APPLICATIONS

This application claims the benefit of U.S. Provisional Application Ser. No. 63/307,756, filed on Feb. 8, 2022, which is incorporated herein by reference.

TECHNICAL FIELD

The present disclosure relates to gun mounts and safes. More particularly, the present disclosure relates to a lockable gun mount securable to a wall or other surface.

BACKGROUND

Gun owners have an unfulfilled need to access their gun quickly, yet still have the gun in a secure and safe location when not in use. With the increase in gun related incidents each year, this dichotomy between accessibility and safety has become a fundamental concern. Although there are several common methods for securing guns when not in use, each of these methods render the gun inaccessible for self-defense and quick general-purpose access. For example, gun safes, trigger locks, and bolt locks each require time to locate the gun and remove safety devices. Alternative methods, such as disassembly of the gun or separation of the ammunition from the gun, are similarly impractical in time-sensitive situations such as a home invasion.

In contrast, a user who desires to keep a weapon loaded and accessible without security precautions assumes several risks, including theft, accidental discharge, or use by an unwanted individual such as a trespasser or a family member.

Accordingly, there is a need for a lockable gun mount that allows the gun to be kept loaded and accessible, yet safely secured to prevent unwanted use or theft. The lockable gun mount disclosed herein solves these needs and others.

SUMMARY OF EXAMPLE EMBODIMENTS

In some embodiments, a lockable gun mount comprises a stock receiver, a trigger block, and a barrel lock. The stock receiver may comprise a base, a plurality of sidewalls, a receiving aperture, a slot, and one or more fasteners. The trigger block may comprise a trigger lock and a wall member having a receiving aperture and a cap. The barrel lock may comprise a wall member, a hinged door coupled to the wall member, and a locking mechanism configured to secure the hinged door to the wall member.

In some embodiments, the barrel lock further comprises a biometric lock, key locks, pin code locks, combination locks, or other locking mechanisms.

In some embodiments, a wall member comprises a fixed trigger block, a sliding channel, and an adjustable trigger block configured to move along the sliding channel to an appropriate fitting for various types and models of guns.

DETAILED DESCRIPTION OF EXAMPLE EMBODIMENTS

Figure 1A:
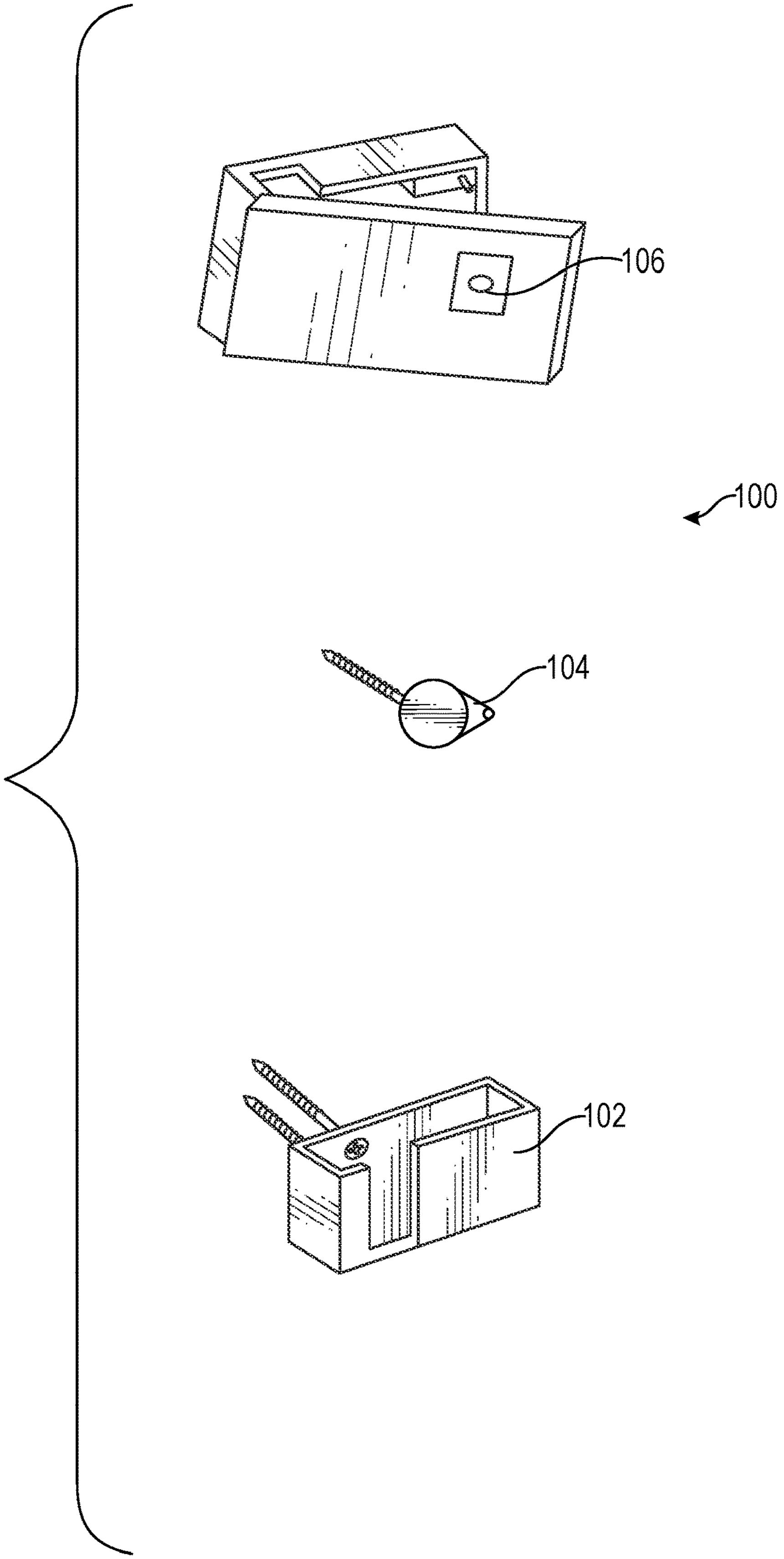
FIG. 1A illustrates a front perspective view of a lockable gun mount.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a lockable gun mount that allows the gun to be loaded and accessible, yet safely secured to prevent unwanted use or theft. The lockable gun mount disclosed herein solves these needs and others.

Figure 1B:
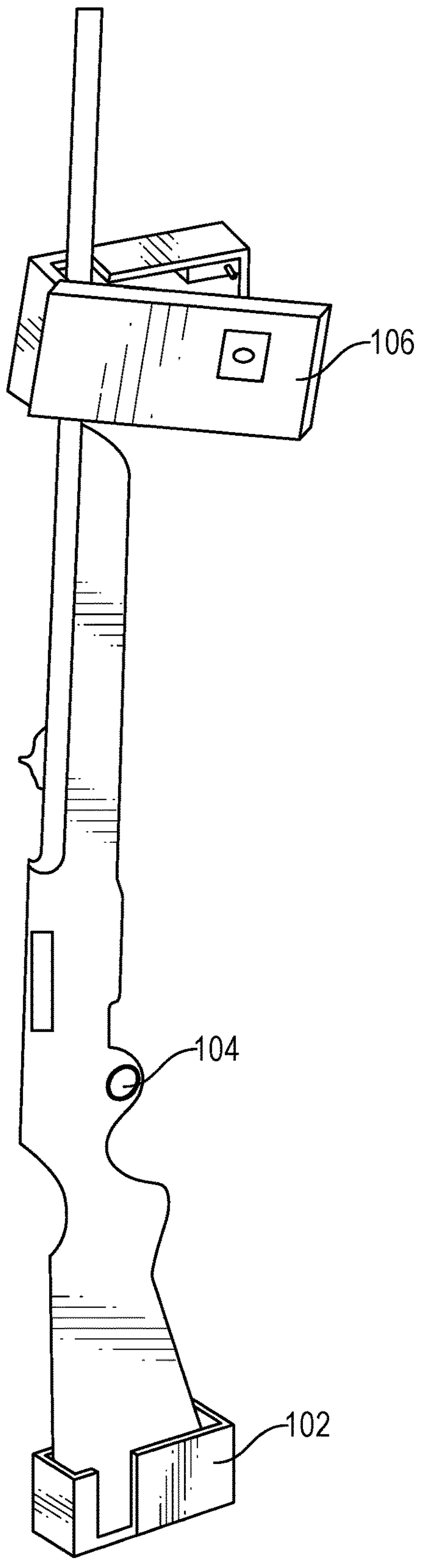
FIG. 1B illustrates a front perspective view of a lockable gun mount securing a gun.

In some embodiments, as shown in FIGS. 1A-1B, a lockable gun mount 100 comprises a stock receiver 102, a trigger block 104, and a barrel lock 106. The lockable gun mount 100 enables the mounting of a gun to a stud within a wall or along any flat surface. While shown in a vertical orientation, the lockable gun mount 100 may be positioned horizontally or at any angle and still be securely mounted to the wall or flat surface. The lockable gun mount 100 may comprise a form factor having an appropriate spatial arrangement and sizing to accommodate a rifle, shotgun, handgun, or any type of firearm. A cumulative force between the stock receiver 102, the trigger block 104, and the barrel lock 106 prevents the lockable gun mount from being removed from the wall or flat surface without the barrel lock 106 first being unlocked.

As shown in FIGS. 2A-2E, the stock receiver 102 is configured to receive a stock 108 of the gun, and comprises a base 109, one or more sidewalls 110, a receiving aperture 111, a slot 112, and one or more fasteners 114A-B. The base 109 provides a backstop to support a weight of the gun when the lockable gun mount 100 is positioned in a vertical orientation and likewise prevents movement of the gun beyond the base 109 in any position. The sidewalls 110 extend vertically from the base 109 in a substantially rectangular shape, though any shape may be used that is configured to secure the gun to the wall and prevent the stock 108 from moving horizontally or vertically while held in the stock receiver 102. A front sidewall 110A comprises the slot 112 configured to permit access to a user to insert or remove the fasteners 114A-B (e.g., screws) through a second wall 110B and into the wall or flat surface behind the stock receiver 102 to which the lockable gun mount 100 is secured.

Figure 2A:
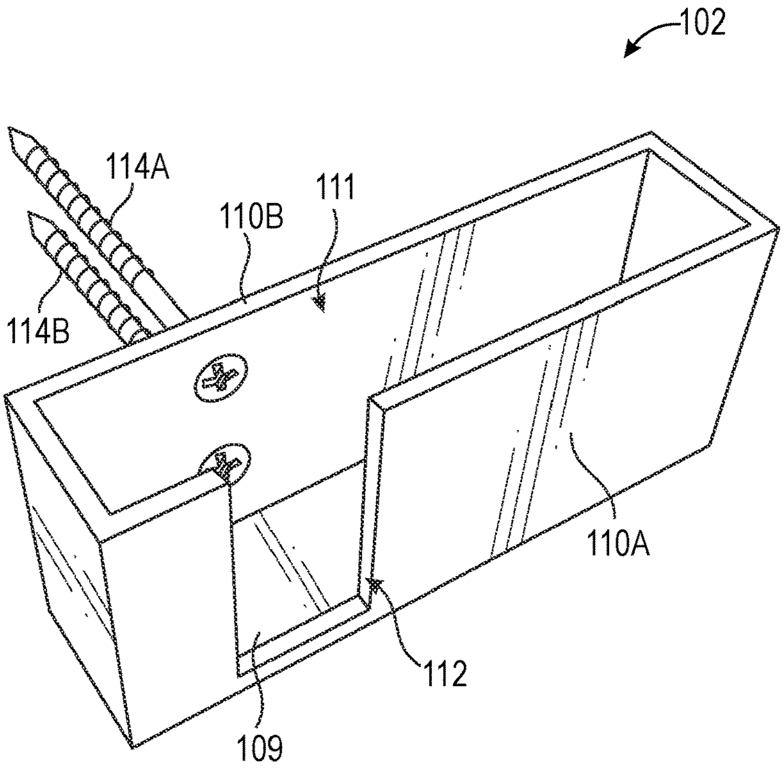
FIG. 2A illustrates a top, front perspective view of a stock receiver of a lockable gun mount.
Figure 2B:
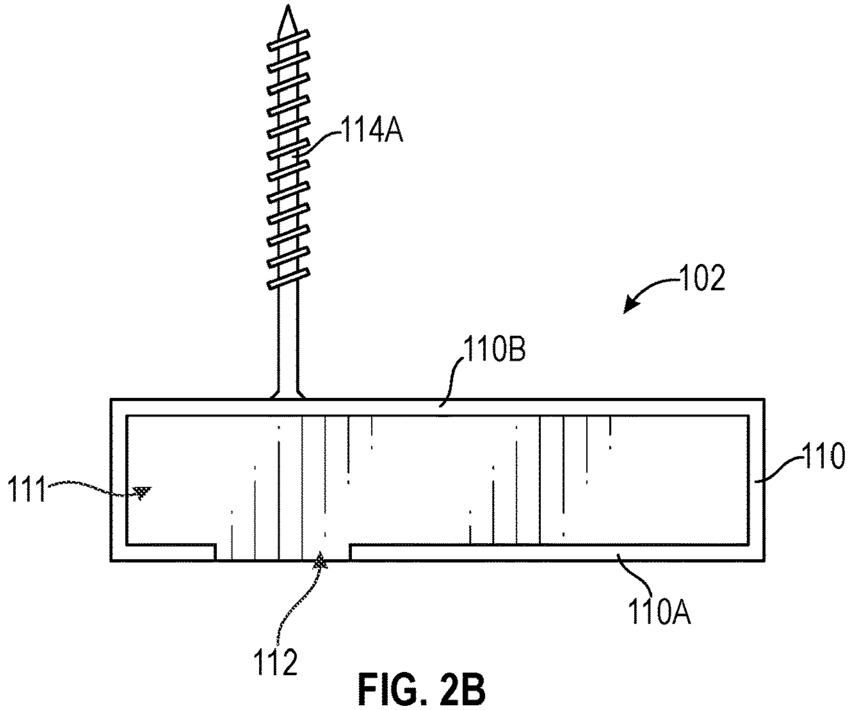
FIG. 2B illustrates a top plan view of a stock receiver of a lockable gun mount.
Figure 2C:
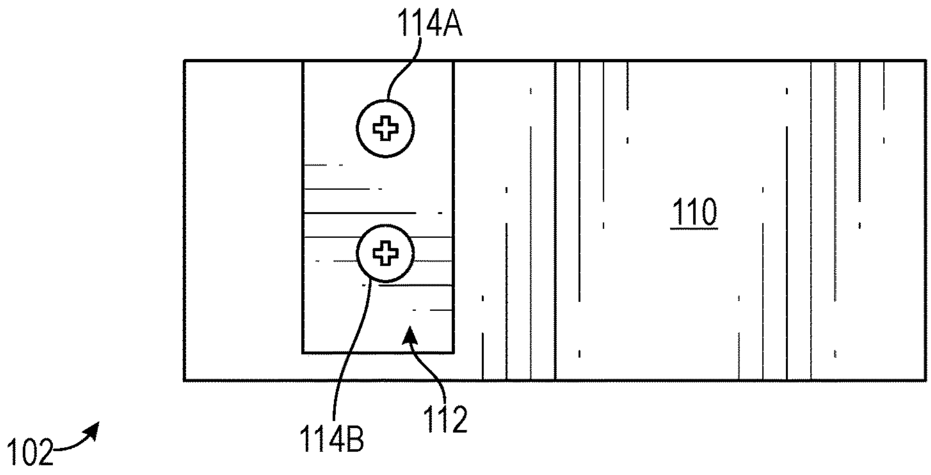
FIG. 2C illustrates a front elevation view of a stock receiver of a lockable gun mount.
Figure 2D:
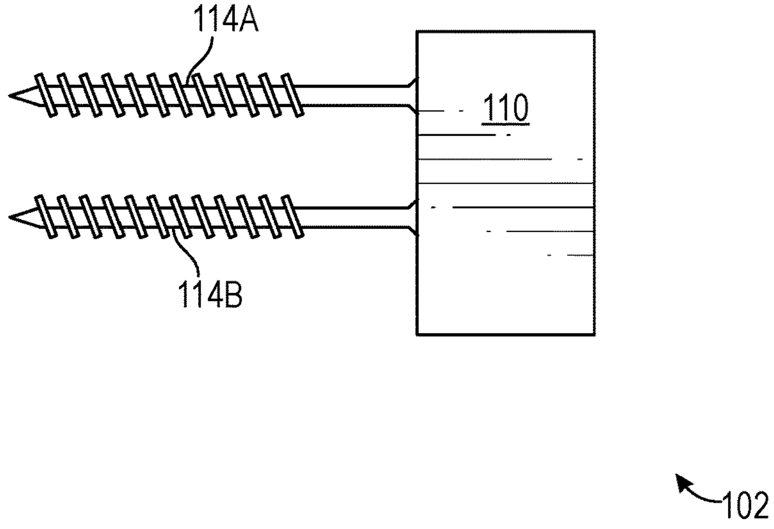
FIG. 2D illustrates a side elevation view of a stock receiver of a lockable gun mount.
Figure 2E:
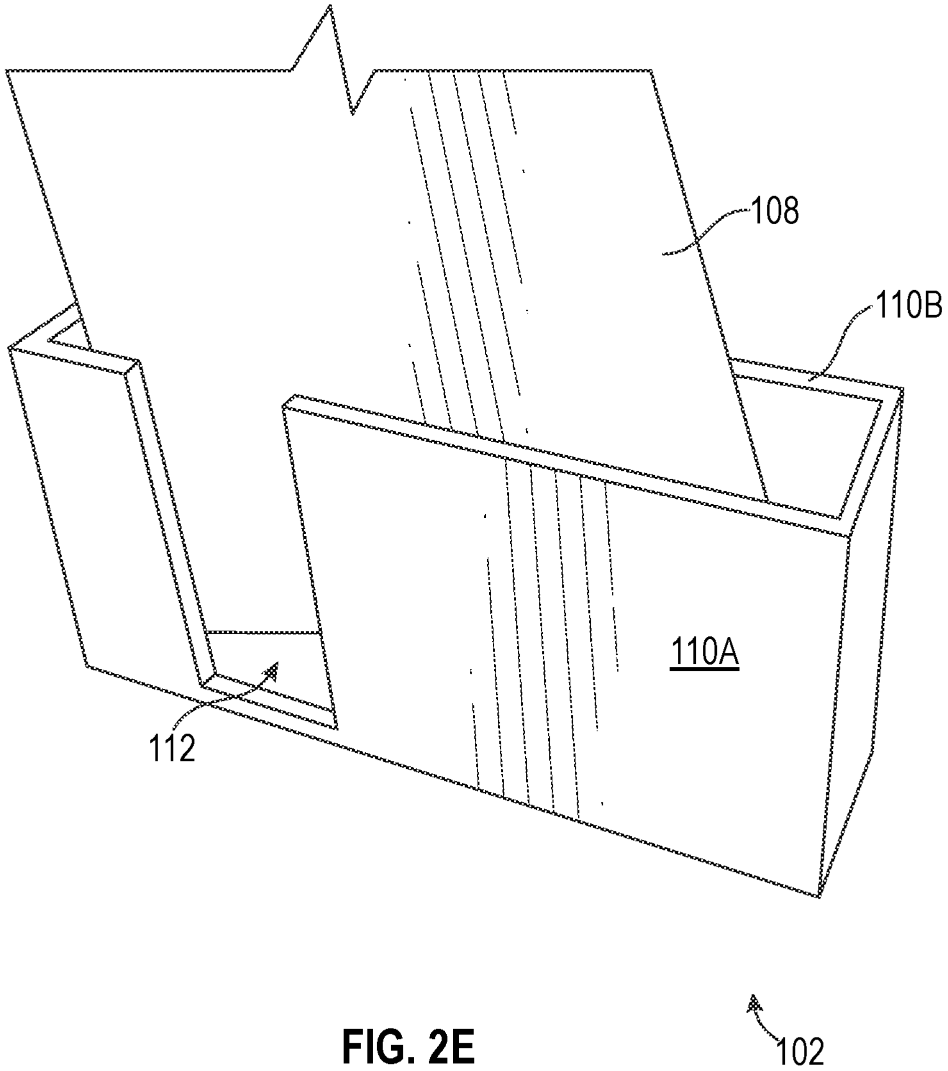
FIG. 2E illustrates a font perspective view of a stock receiver of a lockable gun mount in use.

For example, the fasteners 114A-B may first be inserted through the slot 112 and into the second wall 110B using a screwdriver or other tool, where they may be inserted into a stud of a wall or other surface. Then, as shown in FIG. 2E, after the stock 108 of the gun is inserted into the stock receiver 102, the fasteners 114A-B are concealed (the stock 108 interposed between the second wall 110B and the slot 112), preventing others from tampering with or otherwise loosening them. The fasteners 114A-B may comprise screws, nails, bolts, rivets, magnets, or other fastening mechanisms of sufficient strength to secure the stock receiver 102 to the wall while resisting any attempts at removal.

Figure 3A:
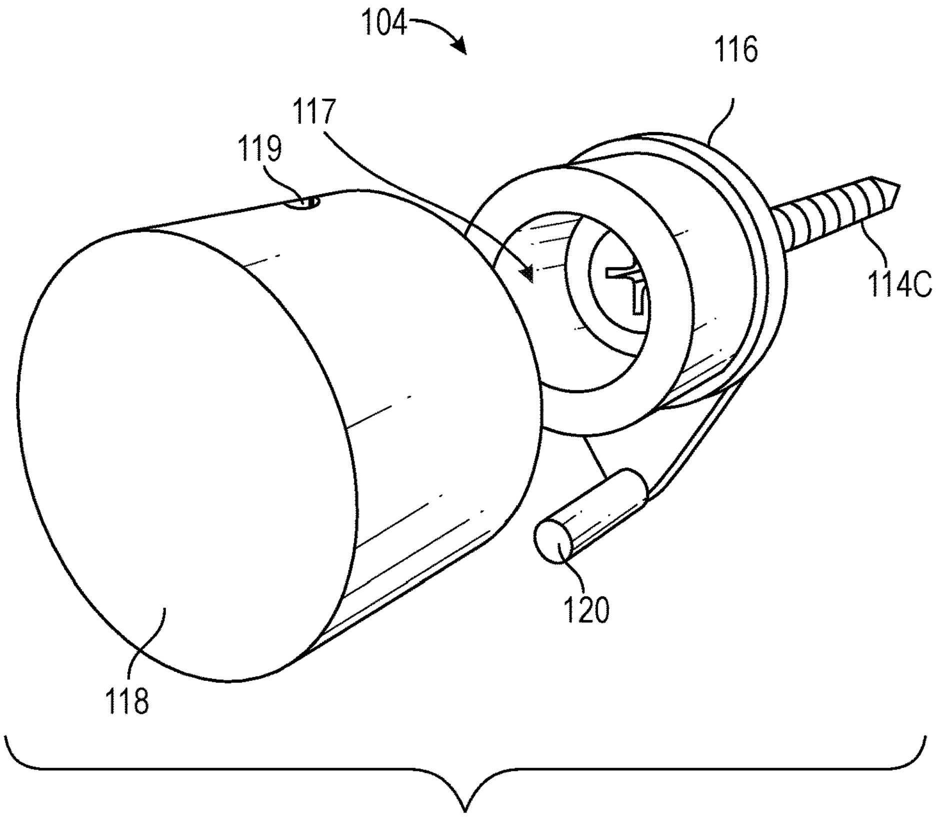
FIG. 3A illustrates a front, perspective disassembled view of a trigger block of a lockable gun mount.
Figure 3B:
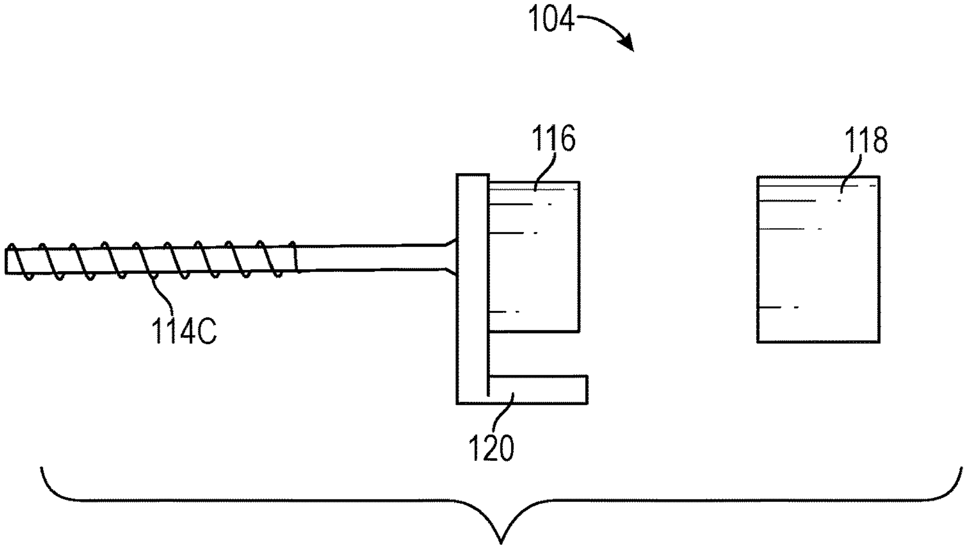
FIG. 3B illustrates a side, elevation disassembled view of a trigger block of a lockable gun mount.
Figure 3C:
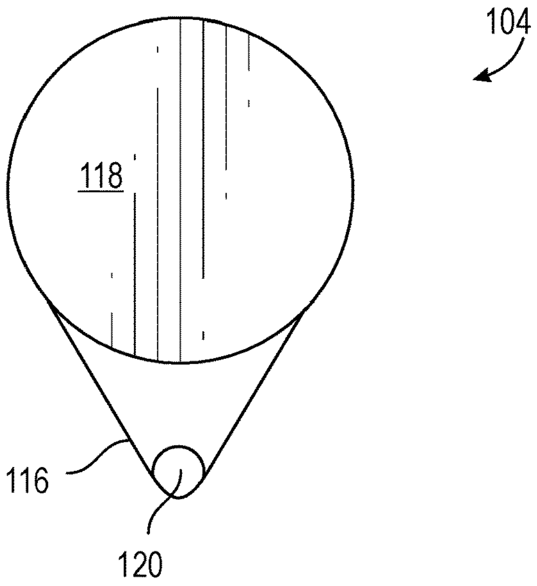
FIG. 3C illustrates a front elevation view of a trigger block of a lockable gun mount.
Figure 3D:
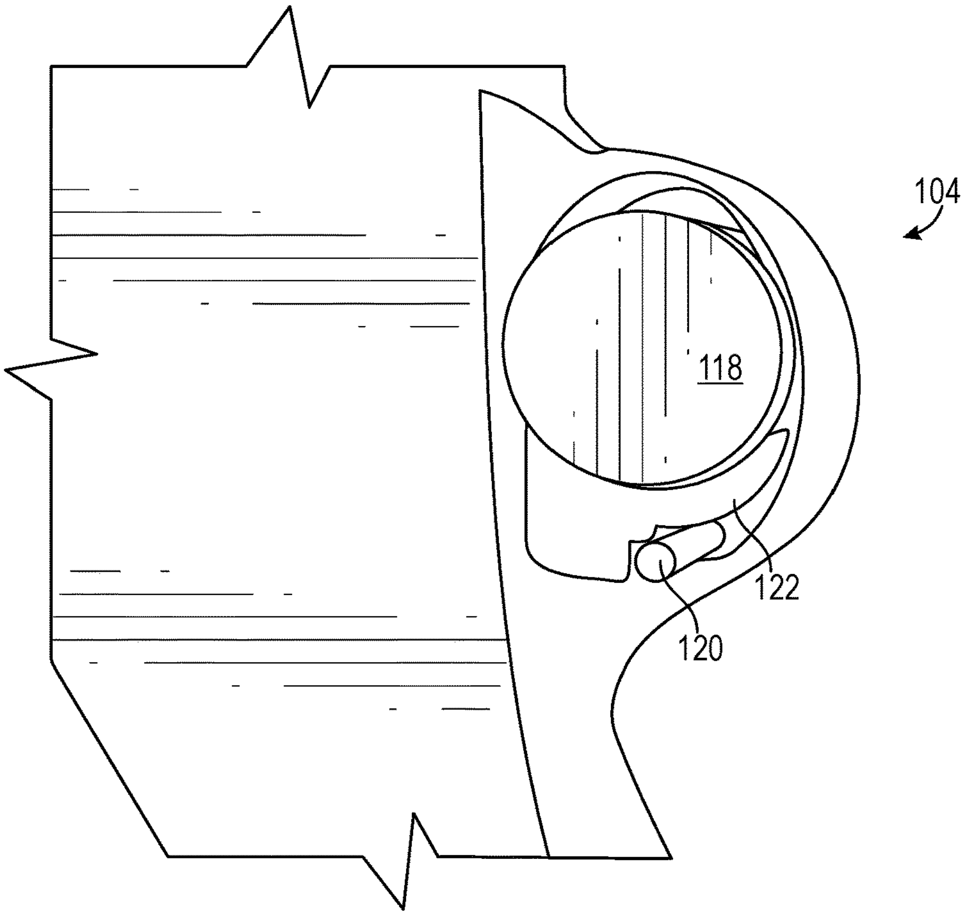
FIG. 3D illustrates a front perspective view of trigger block of a lockable gun mount in use.
Figure 4A:
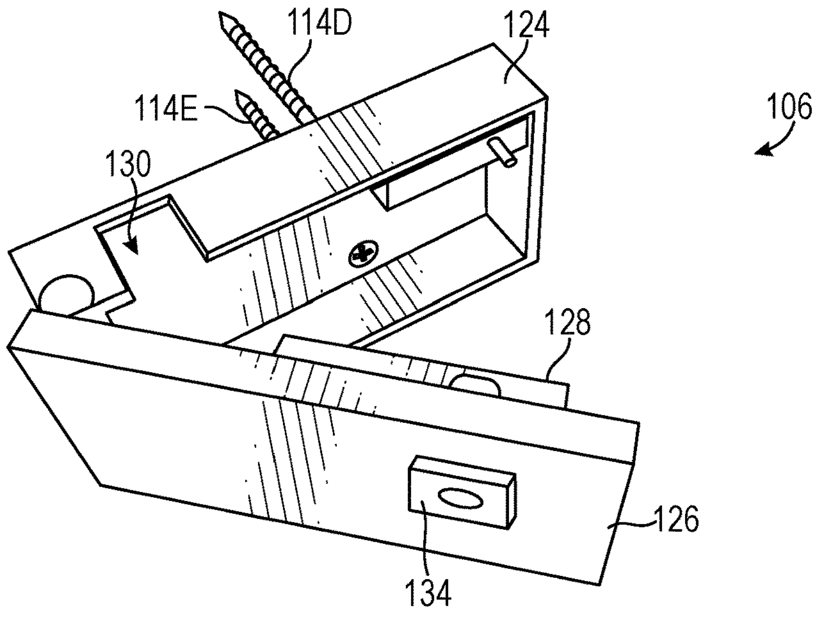
FIG. 4A illustrates a top perspective view of a barrel lock of a lockable gun mount with a hinged door opened.
Figure 4B:
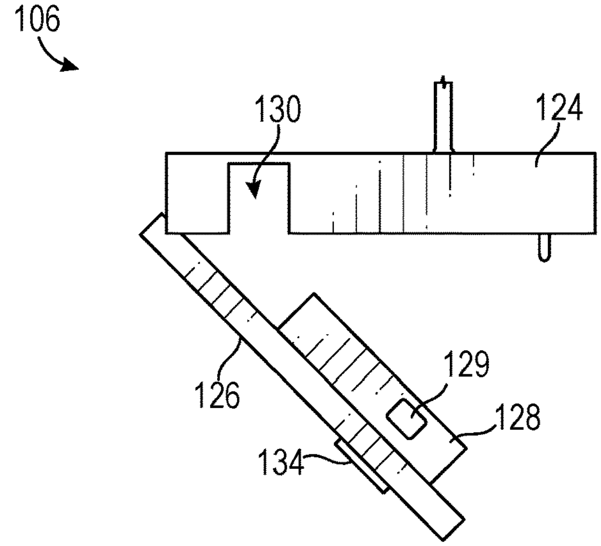
FIG. 4B illustrates a top plan view of a barrel lock of a lockable gun mount with a hinged door opened.
Figure 4C:
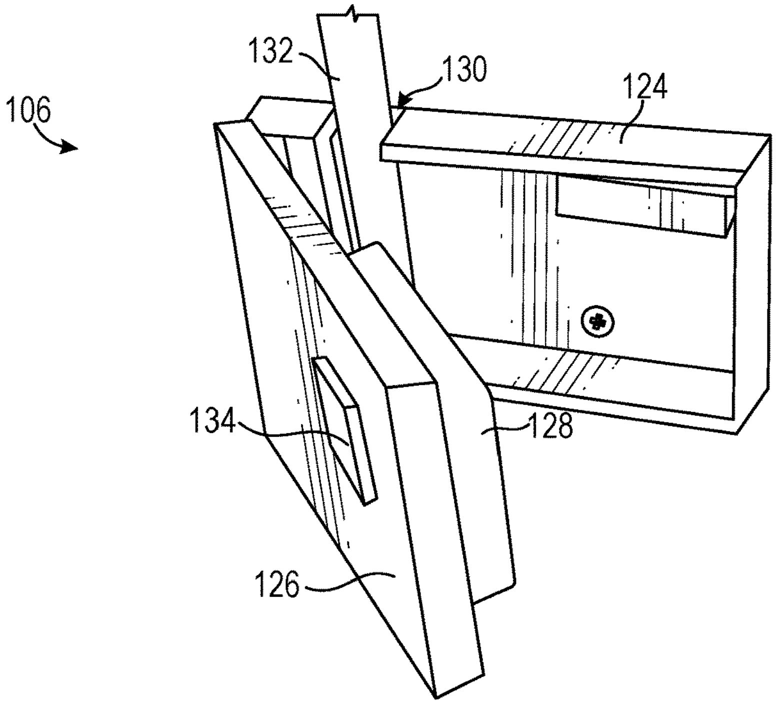
FIG. 4C illustrates a perspective view of a barrel lock of a lockable gun mount in use with a hinged door opened.
Figure 4D:
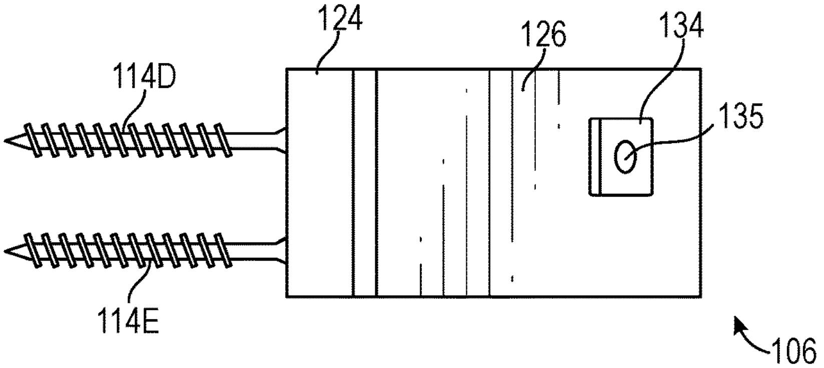
FIG. 4D illustrates a side elevation view of a barrel lock of a lockable gun mount with a hinged door opened.
Figure 4E:
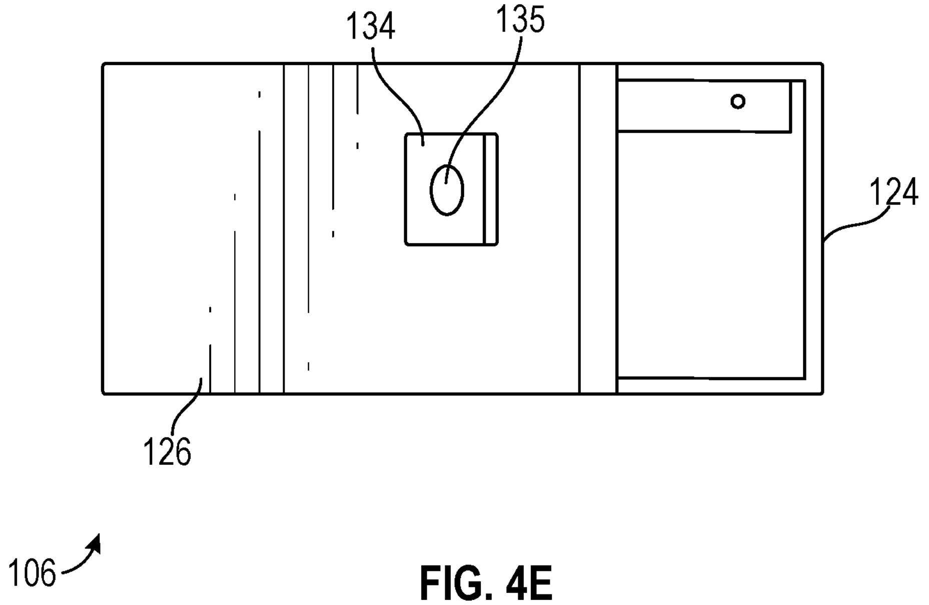
FIG. 4E illustrates a front elevation view of a barrel lock of a lockable gun mount with a hinged door opened.

Referring to FIGS. 3A-3D, the trigger block 104 comprises a wall member 116 having a receiving aperture 117 and a cap 118. The wall member 116 further comprises a trigger rod 120 configured in size, orientation, and rigidity to prevent a trigger 122 (FIG. 3D) of the gun from being pulled while secured within the trigger block 104. In some embodiments, the wall member 116 may comprise a cylindrical shape to both accommodate the insertion of a fastener 114C, shown as a screw having a circular head, as well as fit within a trigger guard of the gun as shown in FIG. 3D.

The wall member 116 may be securely fastened to a wall by inserting a fastener 114C into the receiving aperture 117 of the wall member 116 and into a wall. The cap 118 is then securable around at least a portion of the wall member 116 to prevent the fastener 114C from being exposed. The cap 118 is configured in size and shape so as to further occupy finger space within the trigger guard around the trigger 122 and create a secure fit. The cap 118 may be secured to the wall member 116 via a set screw 119 or other locking mechanism. During use, as best seen in FIG. 3D, the trigger 122 of the gun is interposed between the trigger rod 120 and the cap 118. As a result, the gun is both 1) prohibited from vertical movement, and 2) prohibited from firing. It will be appreciated, however, that when the barrel lock 106 is unlocked (as will be discussed next), the trigger 122 of the gun is readily inserted into the trigger block 104 for storage or removed from the trigger block 104 for use through movement along a generally perpendicular axis relative to the wall.

Referring to FIGS. 4A-4E, in some embodiments, the barrel lock 106 comprises a wall member 124, a hinged door 126 coupled to the wall member 124, and a locking mechanism 128 configured to secure the hinged door 126 to the wall member 124. The wall member 124 may be secured to the wall using one or more fasteners 114D-114E that are exposed when the hinged door 126 is open and concealed when the hinged door 126 is closed. The wall member 124 comprises a barrel aperture 130, spanning a length of the wall member 124, configured to receive a barrel 132 of the gun. As previously discussed, the size of the barrel aperture 130 may vary to accommodate the barrel 132 of a rifle, shotgun, handgun, or any type of firearm. The locking mechanism 128 may comprise deadbolts 129, magnets, key locks, and may be actuatable using keys, pin codes, combinations, or any other mechanism for actuating the locking mechanism 128.

In some embodiments, the locking mechanism 128 may be actuated via a biometric apparatus 134 (e.g., fingerprint sensor 135, microcontroller, and motor/solenoid for actuating the locking mechanism (e.g., bolt) 128) configured to identify biometric data such as fingerprints, retinas, or facial features. In some embodiments, the locking mechanism 128 may be actuated between a locked and an unlocked state using a keycard or via a software application on the user's personal electronic device (e.g., smartphone). In other words, the locking mechanism 128 may comprise a wireless transceiver capable of communicating wirelessly with a user's personal electronic device. Any known wireless protocols may be used, such as Wi-Fi, Bluetooth, NFC, etc. As such, a user may wirelessly connect to the locking mechanism 128 and configure it using a smartphone or other electronic device. It will be appreciated that the locking mechanism may comprise components, such as a microcontroller, to facilitate the storing of data and execution of commands received from a user's electronic device.

It will be appreciated that when the hinged door 126 is secured to the wall member 124 via the locking mechanism 128, the barrel 132 is precluded from horizontal movement. Together with the trigger block 104, the gun is also precluded from vertical movement. Accordingly, the stock receiver 102, the trigger block 104, and the barrel lock 106 ensure that the gun cannot be moved or fired while secured within the lockable gun mount 100. This allows a user to store a loaded firearm in a readily accessible location without fear of unintended use. It will be appreciated that the lockable gun mount 100 while secure, also allows the user a means for quickly unlocking the barrel lock 106 and accessing the gun.

Figure 5:
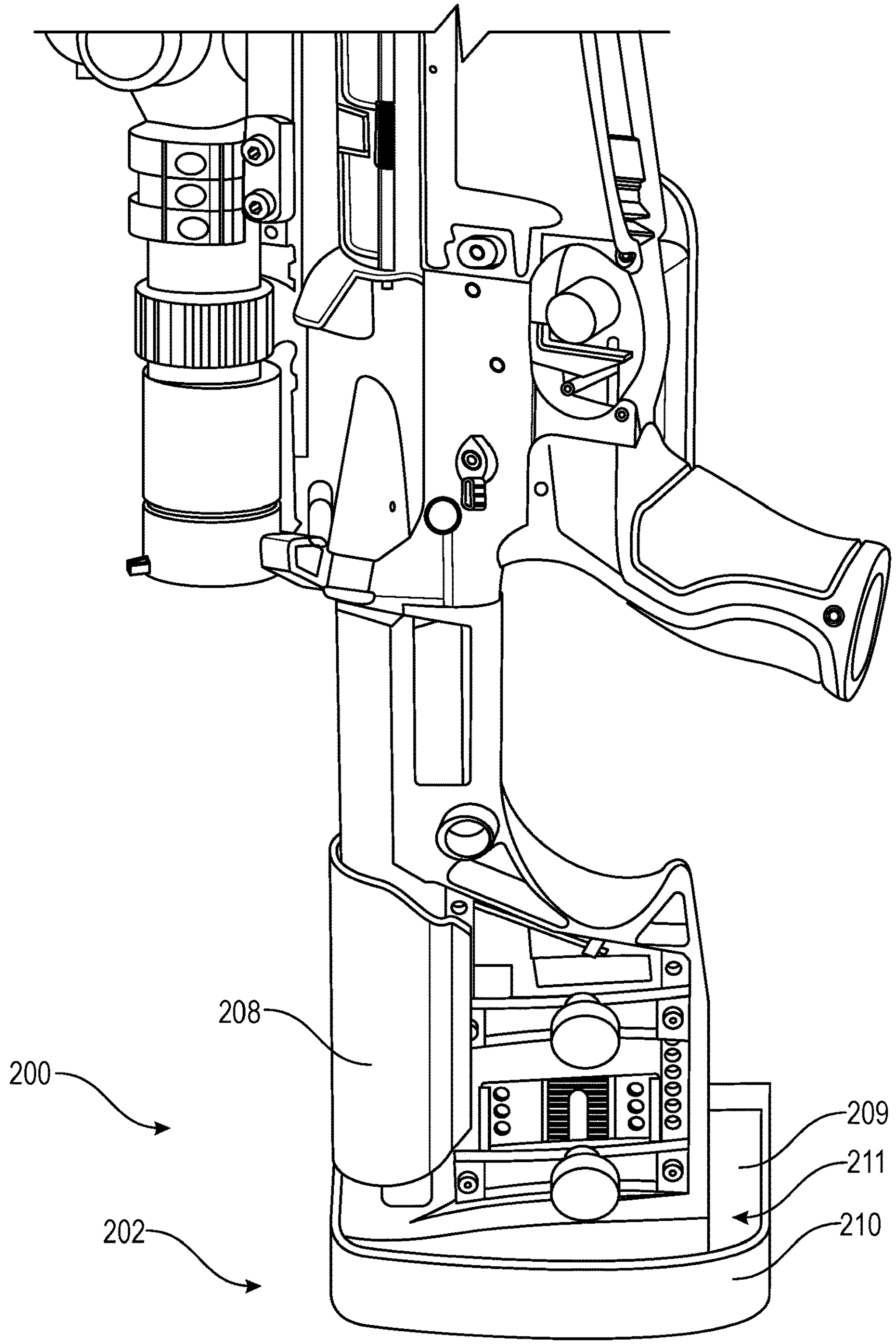
FIG. 5 illustrates a front perspective view of a stock receiver of a lockable gun mount in use.

In some embodiments, as shown in FIG. 5, a stock receiver 202 comprises a backing 209, a rim 210, and a receiving aperture 211. The rim 210 extends outwards from the backing 209 and around at least a portion of a circumference of the receiving aperture 211. A height of the rim 210 is shorter than a height of the backing 209, permitting access to the backing 209 to install fasteners therethrough to a wall. Upon insertion of a stock 208 of a gun, the fasteners are concealed and protected by the stock 208 from removal and tampering in an attempt to free the gun. It will be appreciated that these embodiments do not require a slot in the stock receiver 202 in order to mount the stock receiver 202 to the wall.

Figure 6:
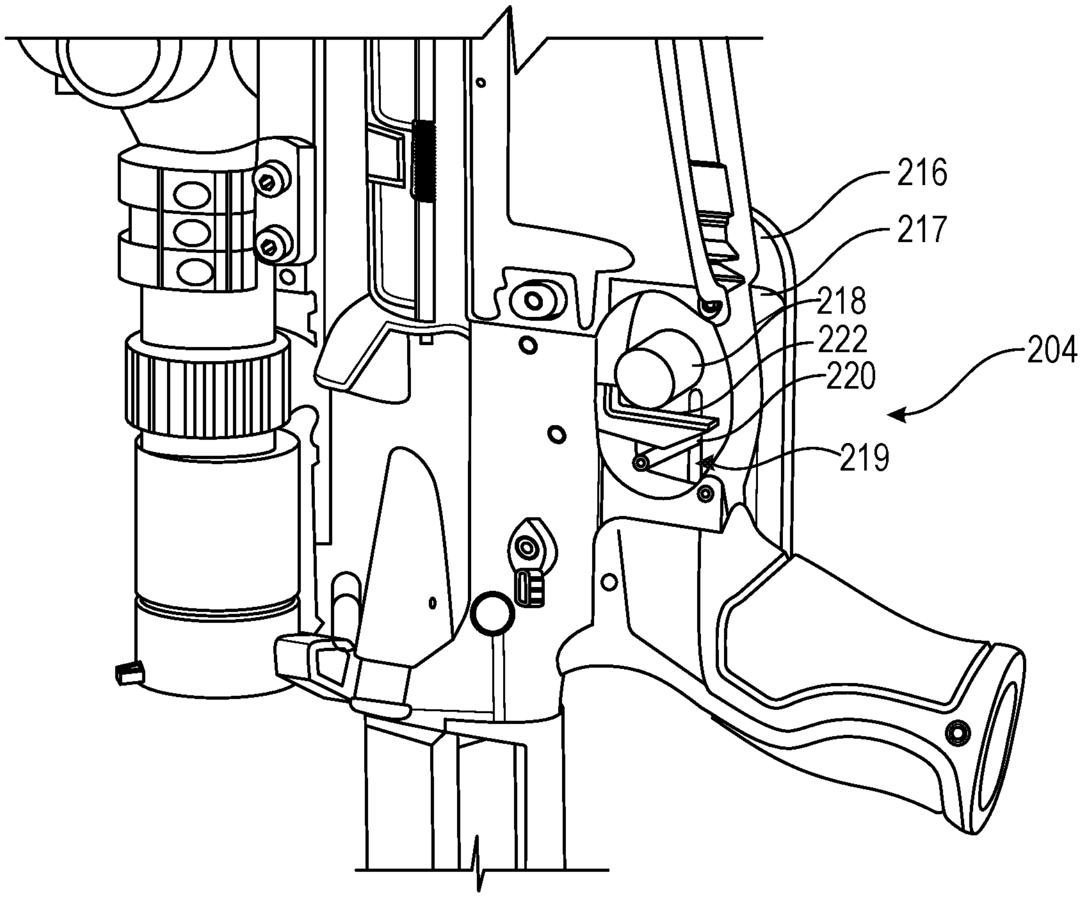
FIG. 6 illustrates a front perspective view of a trigger block of a lockable gun mount in use.
Figure 7A:
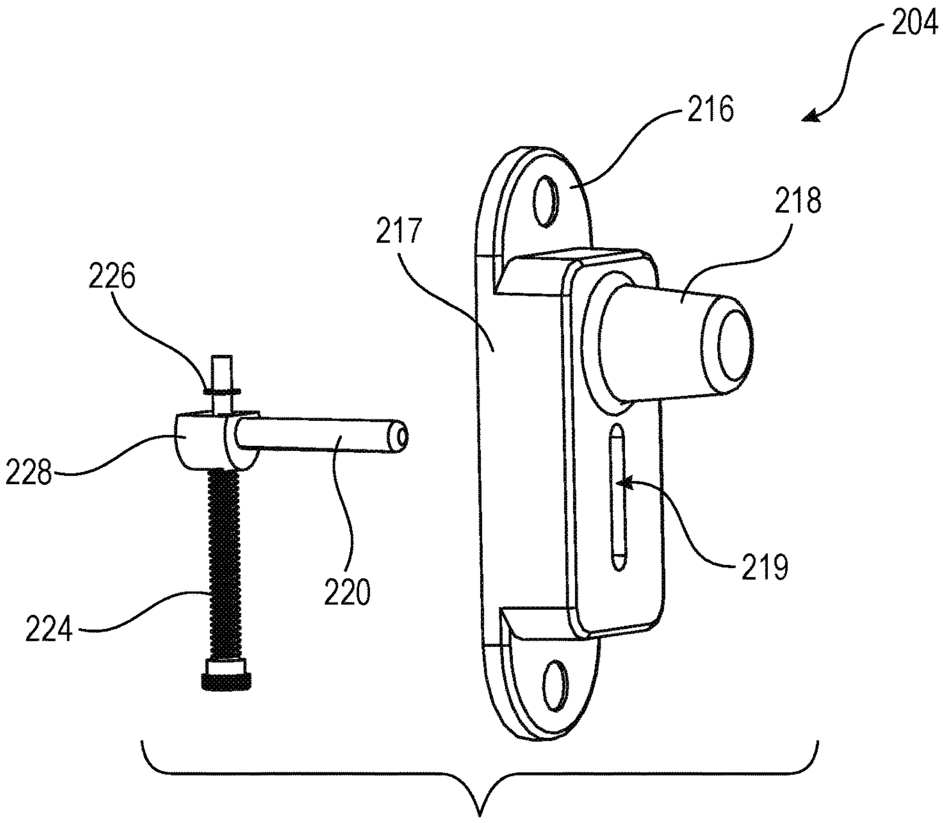
FIG. 7A illustrates a front, side perspective disassembled view of a trigger block.
Figure 7B:
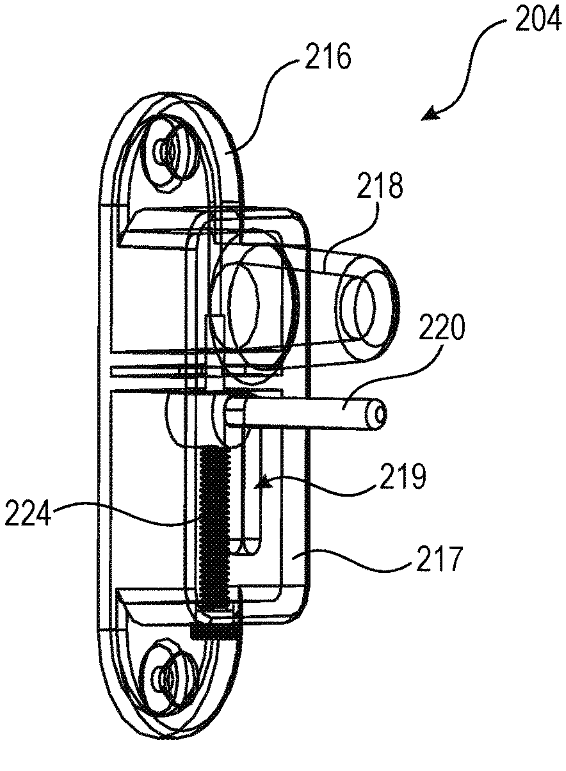
FIG. 7B illustrates a front, side transparent perspective view of a trigger block.

In some embodiments, as shown in FIGS. 6-7B, a lockable gun mount 200 comprises a trigger block 204 that comprises a base plate 216, a fixed trigger protrusion 218, a sliding channel 219, and an adjustable trigger rod 220. The larger the surface area of the base plate 216, the more fasteners may be used to secure the trigger block 204 to the wall, causing the trigger block 204 to be less susceptible to removal. Moreover, the placement of the gun directly over the fasteners in the base plate 216 prohibits access to the fasteners without the need of a cap or covering. The trigger block 204 may further comprise a housing 217 wherein an adjustment mechanism for the trigger rod 220 may reside.

The sliding channel 219 may be positioned along a lateral axis of the housing 217. The adjustable trigger rod 220 is configured to move within the sliding channel 219 to an appropriate fitting for various types and models of guns. This may be accomplished using an adjustment screw 224 and locking ring 226. In other words, as best seen in FIGS. 7A and 7B, the housing 217 houses the adjustment screw 224, which is inserted through a bottom end of the housing 217 and through a receiving body 228 of the trigger rod 220. To prevent the adjustment screw 224 from falling or being withdrawn from the housing 217 and receiving body 228, a locking ring 226 is secured to a top end (opposite the head) of the screw 224. As a result, when a user rotates the adjustment screw 224, it remains in position, causing the receiving body to then move along the adjustment screw 224 longitudinally, thereby causing the trigger rod to slide within the sliding channel 219 to the desired position (abutting the back side of the trigger 222 to prevent the trigger 222 from being pulled or otherwise actuated). The adjustable trigger rod 220 is configured in size, orientation, and rigidity to prevent a trigger 222 of the gun from being pulled while secured within the trigger block 204. The fixed trigger protrusion 218 may be a projection or elevated surface configured in size and shape so as to further occupy finger space within the trigger guard around the trigger 222, opposite the adjustable trigger rod 220 creating a secure fit from both sides of the trigger 222. It will be appreciated that any screws used to fasten the trigger block 204 to the wall or surface are concealed behind the gun, as shown in FIG. 6, preventing withdrawal when a gun is secured thereto using the stock receiver 202 and barrel lock 106.

Other adjustment mechanisms may also be used. For example, the adjustable trigger rod 220 may comprise a bolt on a first surface of the trigger receiver 204 that moves along the sliding channel 219 until secured in place by a nut on a rear surface of the trigger receiver 204.

Figure 8:
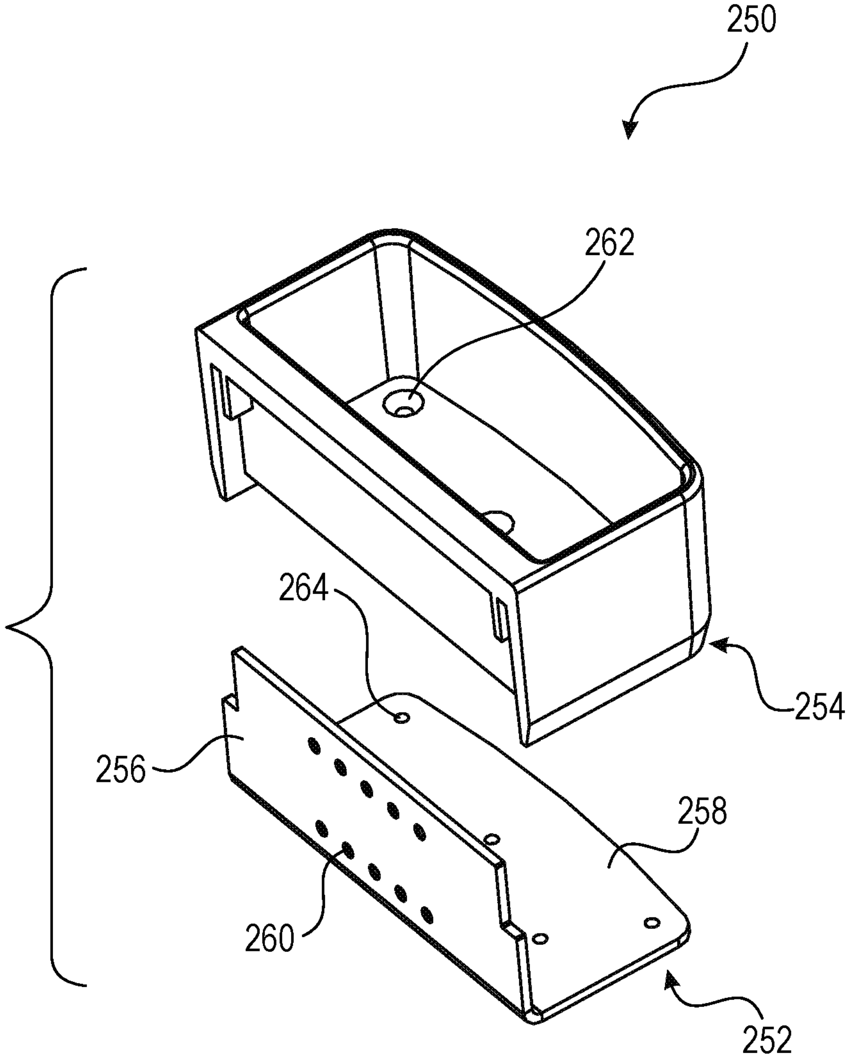
FIG. 8 illustrates a rear, side perspective view of a disassembled stock receiver.
Figure 9A:
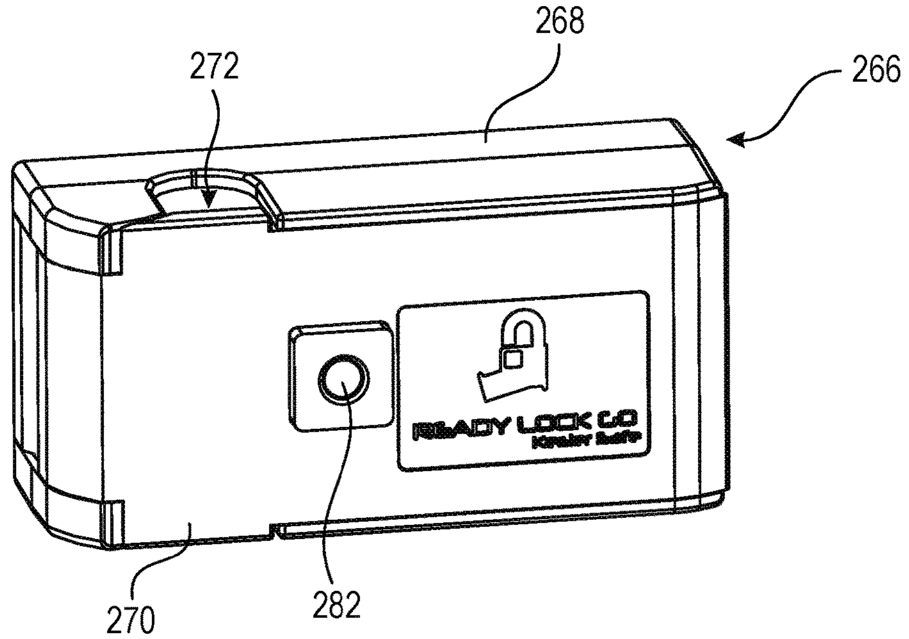
FIG. 9A illustrates a front perspective view of a barrel lock.
Figure 9B:
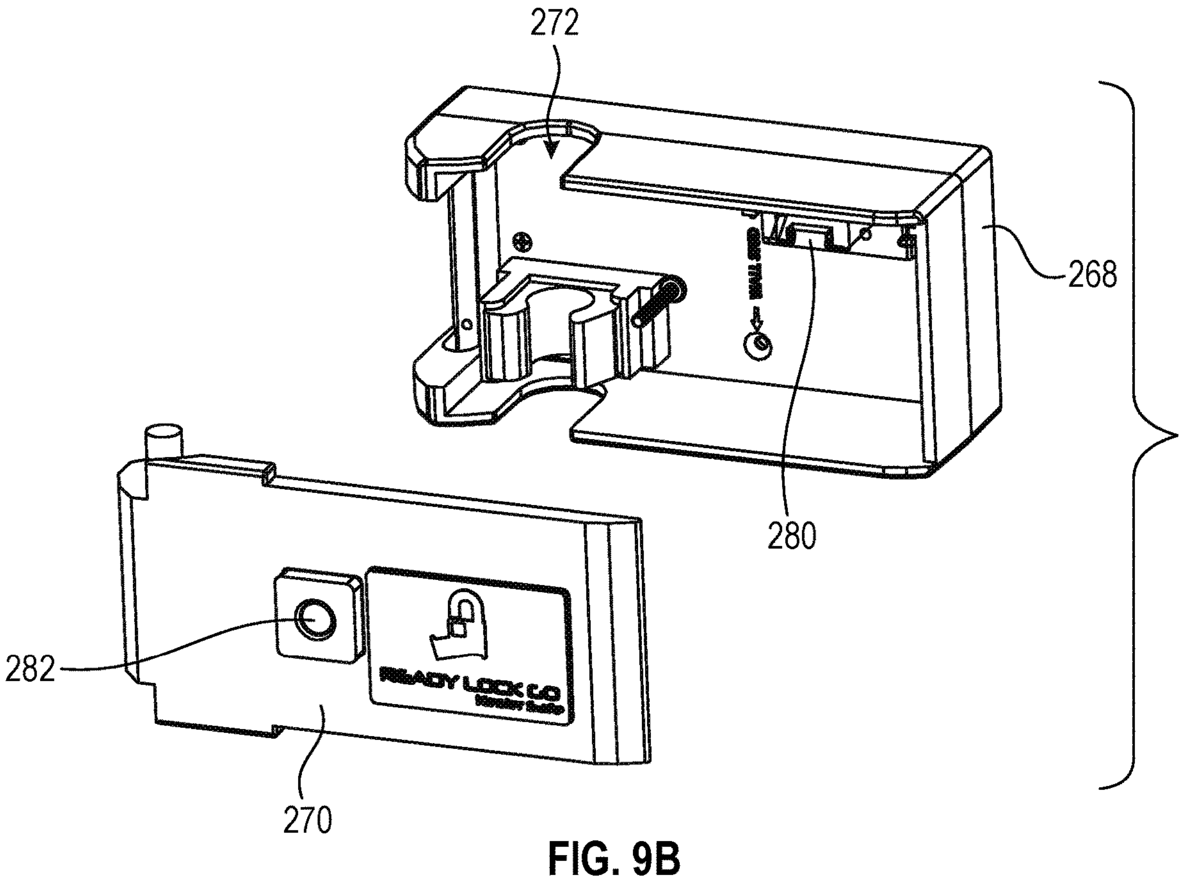
FIG. 9B illustrates a front perspective view of a barrel lock with the hinged door removed.
Figure 9C:
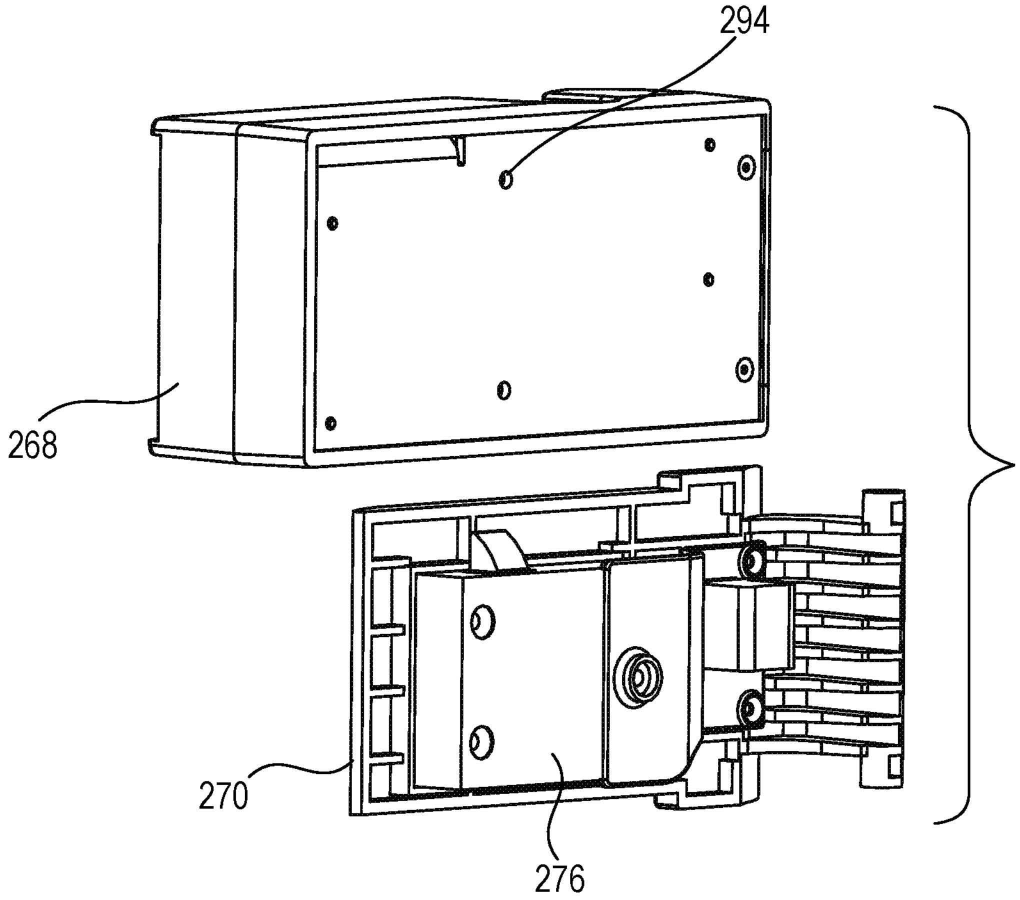
FIG. 9C illustrates a rear perspective view of a barrel lock with the hinged door removed.
Figure 9D:
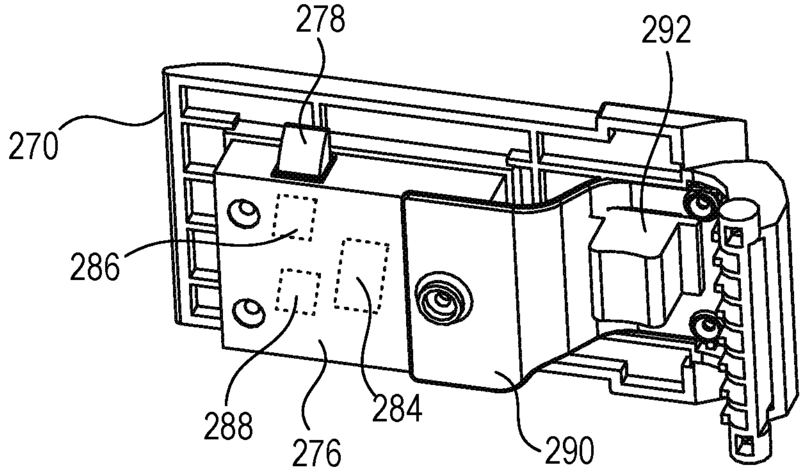
FIG. 9D illustrates a rear perspective view of a hinged door of a barrel lock.

Referring to FIG. 8, in some embodiments, a stock receiver 250 comprises a bracket 252 and a housing 254 securable to the bracket 252. In some embodiments, the bracket 252 is an L-bracket and comprises a surface plate 256 for securing to a surface or wall, and a receiving plate 258 for receiving and holding the housing 254. For example, a user may secure the surface plate 256 to a stud in a wall using screws through a plurality of apertures 260. Once secured to the stud, the housing may be coupled to the receiving plate 258 using screws through housing apertures 262 that align with corresponding receiving plate apertures 264. As will be appreciated, once a stock 208 of a gun is received within the housing 250, the screws coupling the housing 254 to the receiving plate 258 are inaccessible.

Figure 10:
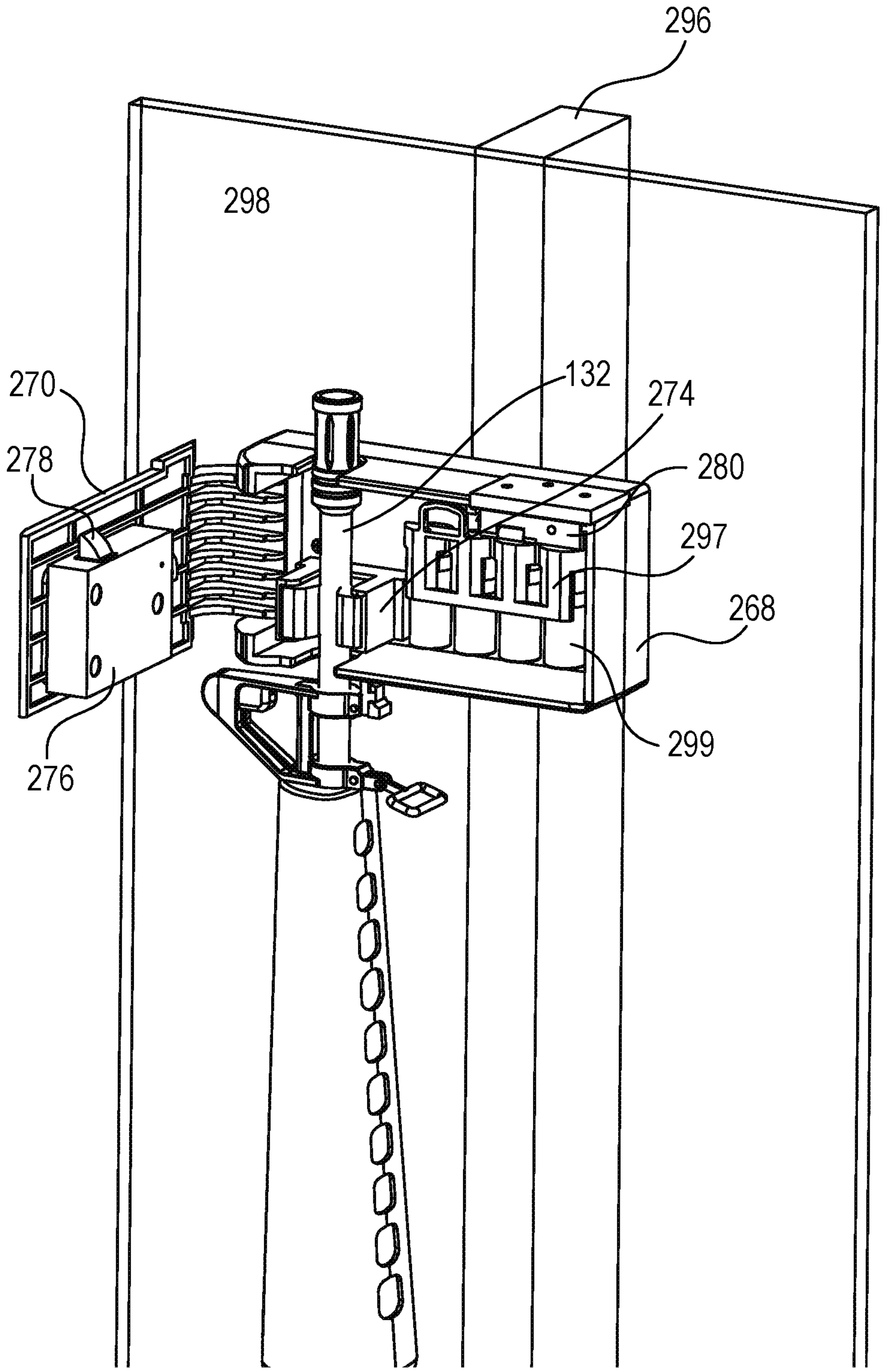
FIG. 10 illustrates a front perspective view of a barrel lock in use with the hinged door in the open position.

Referring to FIGS. 9A-9D, a barrel lock 266 comprises a housing 268, a hinged door 270 hingedly coupled to the housing 268, and a barrel receiving aperture 272. The housing may further comprise a barrel clamp 274 for gripping the barrel 132 of a gun when placed therein, as best seen in FIG. 10. The hinged door 270 comprises a locking mechanism 276 for securing the hinged door 270 to the housing 268 when closed. The locking mechanism 276 comprises a latch 278 for engaging a strike plate 280 located within the housing 268. The locking mechanism 276 may be actuatable using known methods, such as a key or pin code. In some embodiments, as shown, the locking mechanism 276 may be actuatable using a fingerprint sensor 282 (e.g., capacitive scanner, optical scanner, ultrasonic scanner, etc.), a microcontroller 284 (or other processor and memory), and a solenoid 286 or other mechanism for releasing the latch 278, allowing it to clear the strike plate 280, thereby allowing the hinged door 270 to open. In some embodiments, the locking mechanism 276 may comprise a wireless transceiver 288 for wireless communicating with a network or user device, such as a smartphone or tablet. This may allow a user to remotely view the status of the hinged door 270 (e.g., open vs. closed), battery status, authorize remote access by unlocking the locking mechanism 276 using user authentication via the smartphone, enrolling or removing new fingerprints, etc.

The hinged door 270 may further comprise a lock guard 290, and a foam block 292 for abutting the barrel of a gun, the barrel being interposed between the foam block 292 and the barrel clamp 274. The housing 268 may be secured to a surface using screws through a plurality of securing apertures 294.

Figure 11:
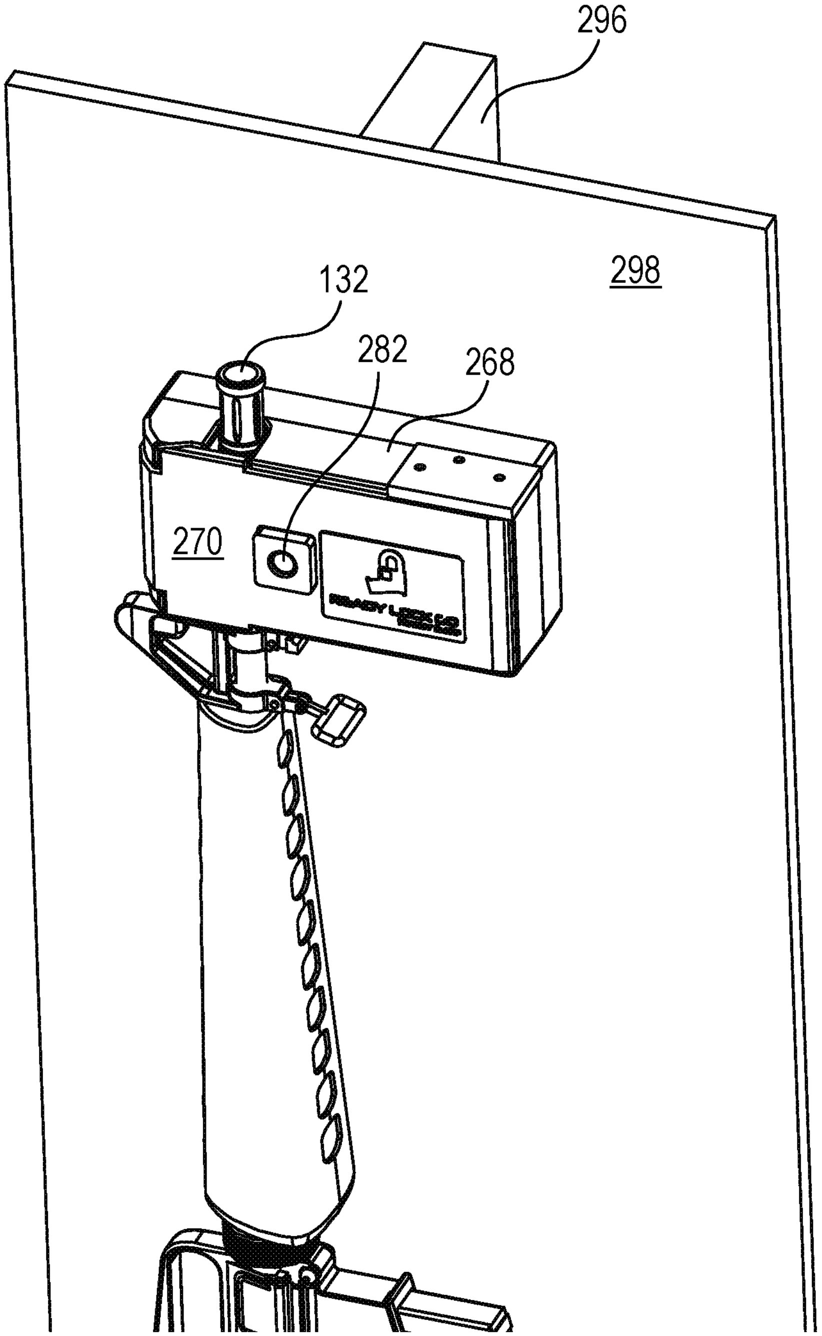
FIG. 11 illustrates a front perspective view of a barrel lock in use with the hinged door in the closed position.

As shown in FIG. 10, when the hinged door 270 is in an open position, the barrel 132 may be inserted or removed from the barrel clamp 274. The housing 268 (also referred to as a wall member) is secured to a stud 296 in a wall 298. Additionally, the housing 268 may comprise a shell holder 297 (e.g., bracket sized so as to hold ammunition, such as by interference fit) for holding ammunition 299. As shown in FIG. 11, when the hinged door 270 is closed, the barrel 132 is secured between the hinged door 270 and the housing 286, preventing the barrel 132 from being withdrawn.

In some embodiments, a method of use comprises a user inserting the stock 108 of a gun into the stock receiver 102, 202 at an angle and then positioning the gun so that it abuts up against or is otherwise proximal and parallel to the wall, securing the trigger 122 from movement with the trigger block 104, 204 and positioning the barrel 132 within the barrel aperture 130, 272 of the barrel lock 106, 266 closing the hinged door 126, 270 and actuating the locking mechanism 128, 276. With the gun positioned within the stock receiver 102, 202 the trigger block 104, 204 and the barrel lock 106, 266 it will be appreciated that the gun cannot be moved in any direction or discharged. Whenever a user desires quick access, however, the method of use further comprises unlocking the barrel lock 106, 206 by actuating the locking mechanism 128, 276 (e.g., placing a finger on the fingerprint sensor 282, opening the hinged door 126, 270, tilting the gun away from the wall and the trigger block 104, 204 and lifting the stock 108 of the gun from out of the stock receiver 102, 202.

In some embodiments, the method of use further comprises using a key, keycard, pin code, or software application, to unlock the locking mechanism 128, 276. In some embodiments, the method of use comprises inputting biometric data, such as the user's fingerprints, retinas, or facial features, into the biometric sensor 134, 282 to unlock the locking mechanism 128, 276. As a result, the gun may be used in a matter of seconds. In some embodiments, the hinged door 126, 270 may be spring-loaded so that when the locking mechanism 128, 276 is in the open position, the hinged door 126, 270 automatically extends away from the wall member 124 or housing 268 to allow quick removal of the barrel 132.

Accordingly, it will be appreciated that the lockable gun mount 100, 200 solves the need for a gun to be stored and secured in a readily accessible location while being loaded, overcoming problems with safety and availability in the prior art.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A lockable gun mount, comprising:

a stock receiver configured to receive a stock of a gun, the stock receiver comprising sidewalls and securable to a surface at a first location, the sidewalls comprising a slot configured to enable a user to insert or remove fasteners through the stock receiver and into the surface;

a trigger block securable to the surface at a second location, the trigger block configured to prevent a trigger of the gun from being actuated; and a barrel lock securable to the surface at a third location, the barrel lock comprising a wall member comprising a barrel aperture and a hinged door coupled to the wall member, the hinged door configured to secure a barrel within the barrel aperture of the wall member when closed, the barrel lock comprising a locking mechanism for selectively locking or releasing the hinged door to thereby lock or release the barrel in the barrel lock, wherein the locking mechanism of the barrel lock further comprises a biometric sensor.

2. The lockable gun mount of claim 1, wherein the stock receiver comprises a base, the sidewalls extending upwardly from the base, and a receiving aperture circumscribed by the sidewalls.

3. The lockable gun mount of claim 1, wherein the stock receiver comprises a bracket and a housing couplable to the bracket.

4. The lockable gun mount of claim 1, wherein the trigger block comprises a wall member, a receiving aperture, and a cap couplable to the wall member, the cap configured to conceal the receiving aperture.

5. The lockable gun mount of claim 1, wherein the trigger block comprises a base plate, a fixed trigger protrusion, a sliding channel, and an adjustable trigger rod slidable in the sliding channel.

6. The lockable gun mount of claim 1, wherein the barrel lock comprises:

a wall member comprising a barrel aperture; and a hinged door coupled to the wall member, the hinged door configured to secure the barrel within the barrel aperture of the wall member when closed.

7. The lockable gun mount of claim 1, further comprising fasteners couplable to the stock receiver, the trigger block, and the barrel lock, configured to secure the lockable gun mount to the surface.

8. The lockable gun mount of claim 1, wherein the stock receiver comprises a backing and a rim, wherein the rim is shorter in height than the backing, enabling a user to insert or remove fasteners through the backing and into the surface.

9. The lockable gun mount of claim 1, wherein the locking mechanism of the barrel lock is actuatable using a key, a pin code, or a keycard.

10. The lockable gun mount of claim 1, wherein the locking mechanism of the barrel lock is configured to actuate using a software application on a user's personal electronic device.

11. A lockable gun mount, comprising:

a stock receiver configured to receive the stock of a gun, the stock receiver comprising:

a bracket comprising a surface plate and a receiving plate, and a housing configured to couple to the receiving plate of the bracket;

a trigger block configured to prevent a trigger of the gun from being actuated, the trigger block comprising:

a wall member, a fixed trigger protrusion receivable within a trigger guard of the gun on a first side of the trigger, and a trigger rod on a second side of the trigger; and a barrel lock configured to accommodate a barrel of the gun, the barrel lock comprising:

a wall member, a hinged door coupled to the wall member, and a locking mechanism configured to secure the hinged door to the wall member.

12. The lockable gun mount of claim 11, wherein the trigger block further comprises a sliding channel and wherein the trigger rod is configured to slide within the sliding channel to a user-desired position.

13. The lockable gun mount of claim 11, wherein the locking mechanism of the barrel lock further comprises a biometric sensor.

14. The lockable gun mount of claim 11, wherein the locking mechanism of the barrel lock is actuatable using a key, a pin code, or a keycard.

15. The lockable gun mount of claim 11, wherein the locking mechanism of the barrel lock is configured to actuate using a software application on a user's personal electronic device.

* * * * *